Figure 3:
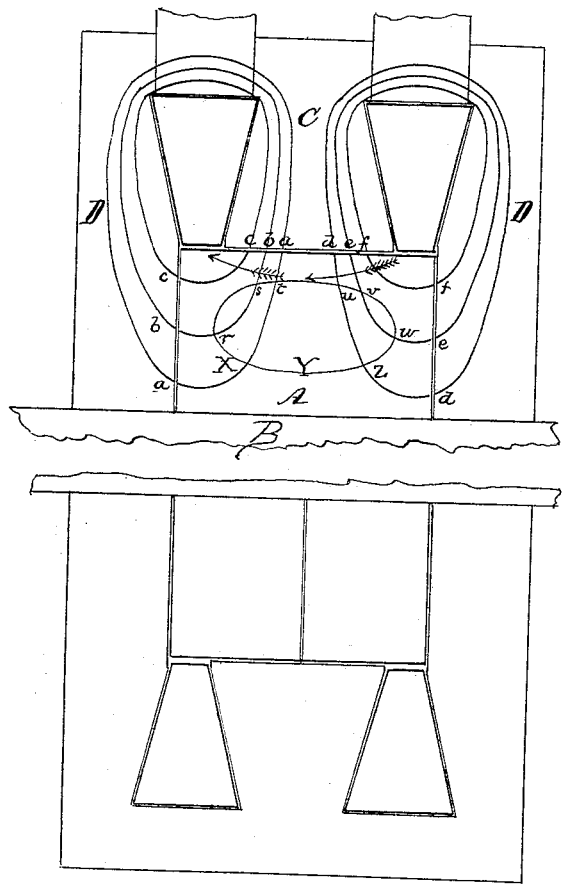

(No Model.) 4 Sheets—Sheet 1.
G. FORBES.
DYNAMO ELECTRIC MACHINE.
No. 338,169. Patented Mar. 16, 1886.
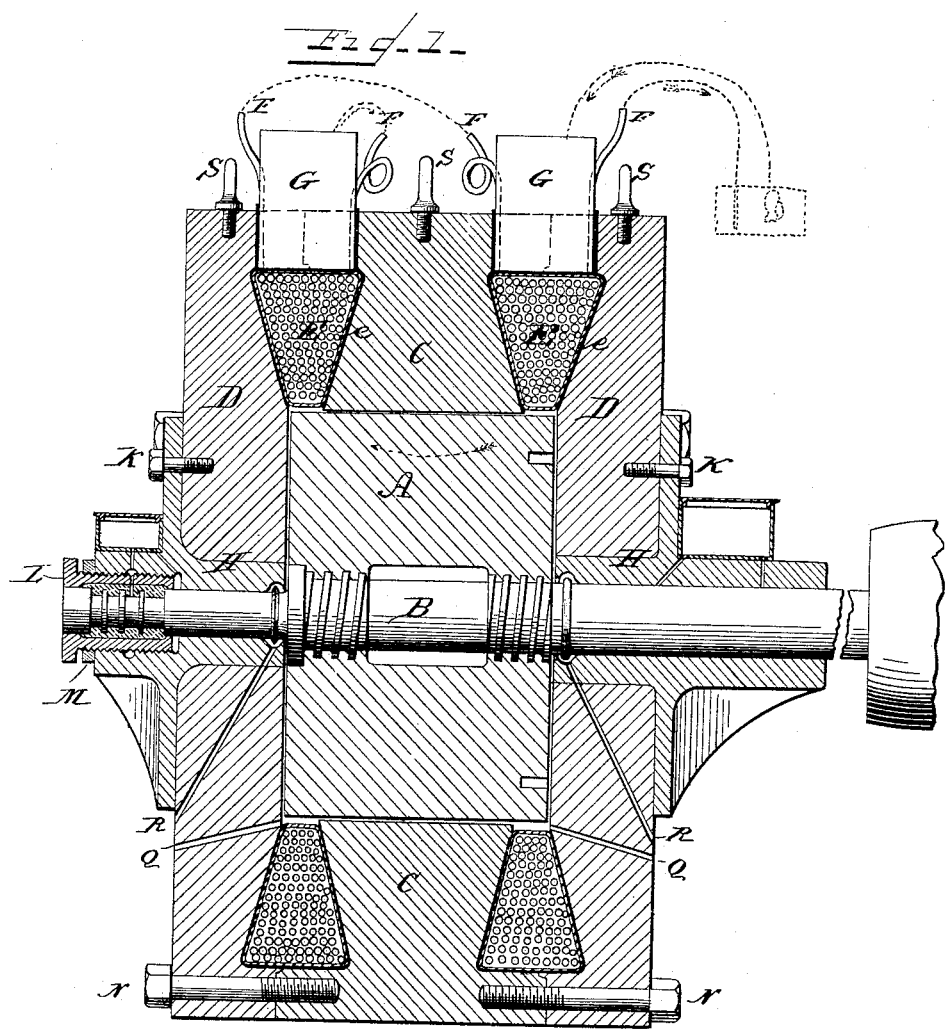
WITNESSES
F. L. Durand
Daniel Scott
George Forbes
INVENTOR
by Connolly Bros.
Attorneys (No Model.)   4 Sheets—Sheet 2.
G. FORBES.
DYNAMO ELECTRIC MACHINE.
No. 338,169.   Patented Mar. 16, 1886.
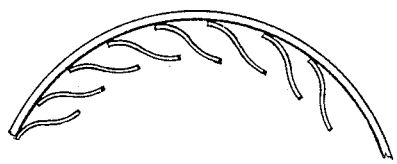
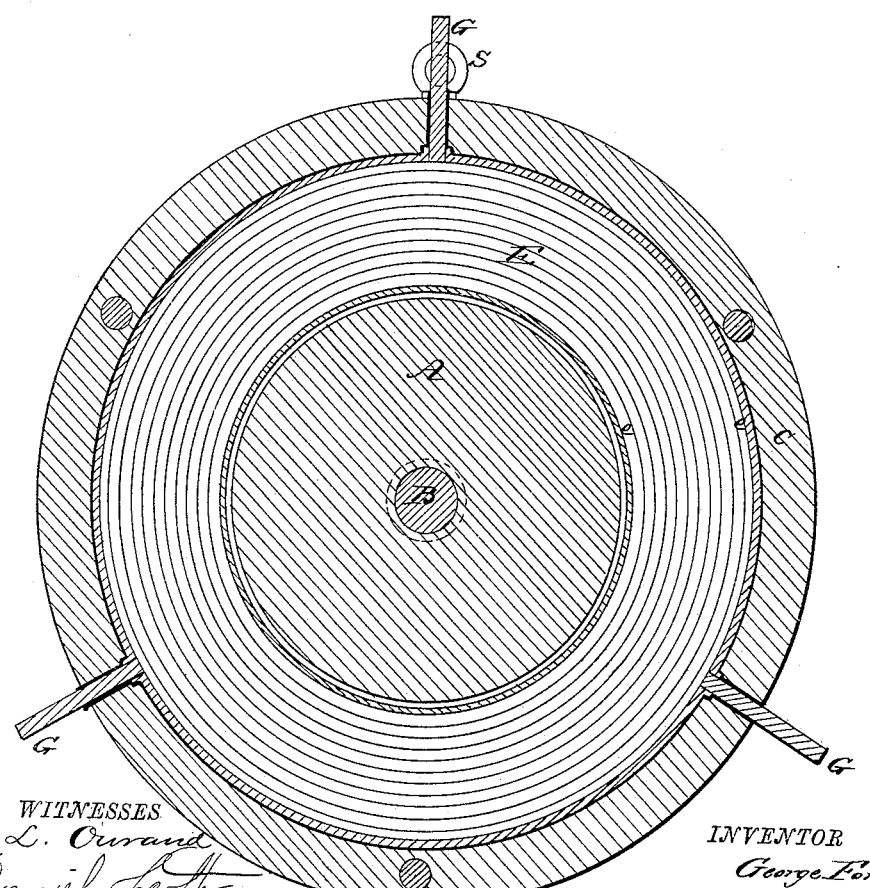
WITNESSES
F. L. Ourand
Daniel Fertt
INVENTOR
George Forbes
by Connolly Bros
Attorneys (No Model.)   G. FORBES.   4 Sheets—Sheet 3.
DYNAMO ELECTRIC MACHINE.

No. 338,169.   Patented Mar. 16, 1886.

Fig. 3ª

WITNESSES:

INVENTOR
George Forbes
BY Connolly Bros
ATTORNEYS (No Model.)
G. FORBES.
DYNAMO ELECTRIC MACHINE.
No. 338,169. Patented Mar. 16, 1886.
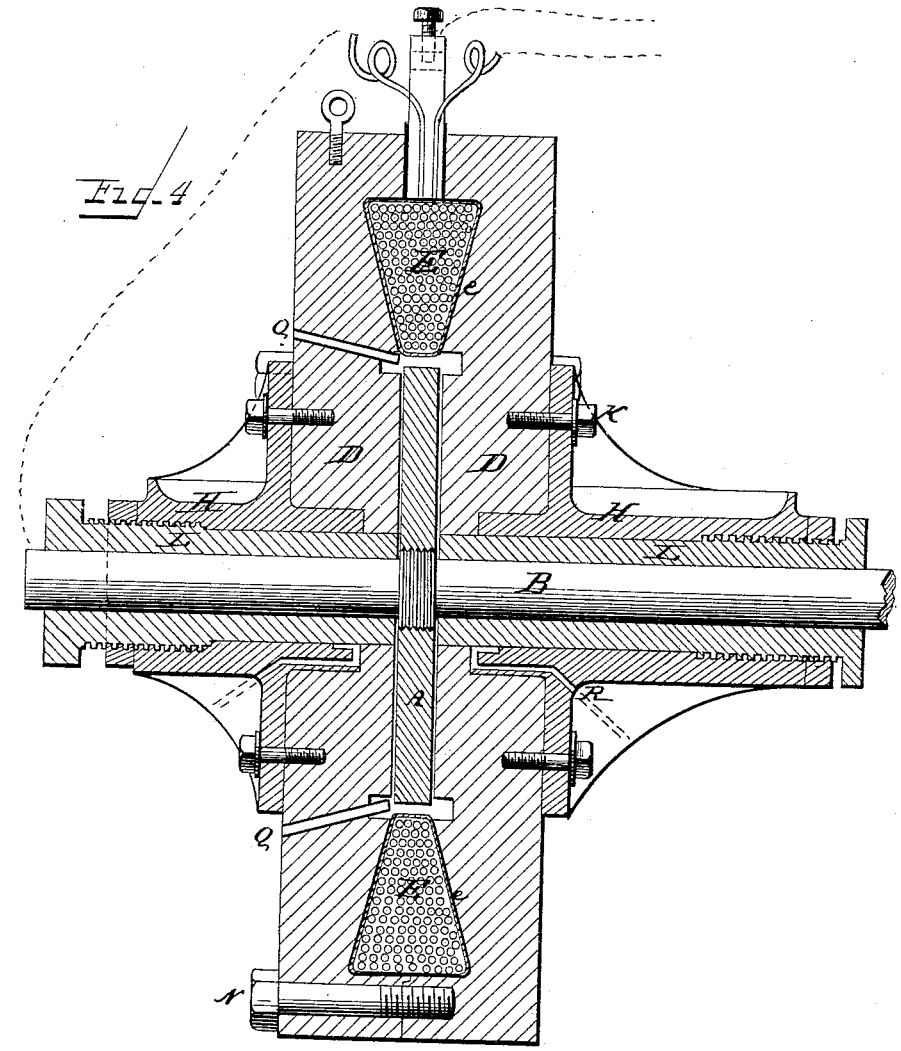

UNITED STATES PATENT OFFICE.

GEORGE FORBES, OF LONDON, COUNTY OF MIDDLESEX, ENGLAND.

DYNAMO-ELECTRIC MACHINE.

SPECIFICATION forming part of Letters Patent No. 338,169, dated March 16, 1886.

Application filed October 11, 1884. Serial No. 145,209. (No model.) Patented in England June 22, 1883, No. 3,115, and in France December 19, 1883, No. 159,262.

*To all whom it may concern:*

Be it known that I, GEORGE FORBES, a subject of the Queen of Great Britain, residing at London, in the county of Middlesex, England, have invented certain new and useful Improvements in Machines for Generating Electricity, (patented in England June 22, 1883, No. 3,115, and in France December 19, 1883, No. 159,262;) and I do hereby declare the following to be a full, clear, and exact description of the invention, reference being had to the accompanying drawings, which form part of this specification.

My invention has relation to a machine for generating constant currents of electricity by the revolution of a mass of magnetized material without coils within the influence of a mass of iron provided with magnetizing-coils, and constituting the field of force under such conditions that the lines of force set up in the mass constituting the armature will converge toward one of the poles thereof, situated between two poles opposed thereto, while the electric currents set up by reason of a difference of potential between different points in the moving mass will be caused to intersect each line of force at one point, and may be collected from the surface of such mass.

My invention consists, essentially, in a machine for generating electric currents under the conditions above stated, and comprising a revolving mass of magnetic material constituting a naked armature, an encompassing mass of magnetic material, within which are embedded the magnetizing-coils and which constitutes the field, and means for collecting the currents of electricity from the surface of the armature.

While the details of construction of machines embodying my invention are susceptible of various modifications without departing from the spirit thereof, as will be presently indicated, I will now describe, specifically, a preferable form and arrangement which is at once simple and effective.

In this machine the armature is a single cylindrical body of iron mounted on a shaft, and the field-magnet is a box-like mass of iron completely encompassing the armature, and provided with openings in the sides for the passage of the armature-shaft. The magnetizing-coils which serve to magnetize both the field-magnet and the armature are set in metallic troughs embedded in and insulated from the field-magnet and surround the ends of the armature, a connection being established between the interiors of the troughs and the periphery of the armature for the passage of the current from one trough to the other through the armature, the conductors for completing the electric circuit being connected with the troughs. The energizing-current passes through the coils in opposite directions, respectively, whereby the armature is so magnetized that it has like poles at either end and an opposite pole at the middle of its periphery, and the polar points of the field-magnet are in opposition thereto.

In the accompanying drawings, Figure 1 is a vertical section of the machine along the axis of the shaft; Fig. 2, a cross-section through either end of the armature; Fig. 3, a diagram illustrating the direction of the lines of force and of the electric current. Fig. 3ª is a modification showing two cylinder disk-armatures; Fig. 4, a vertical section of a modified form of machine, and Fig. 5 a detail.

A is a revolving cylinder of iron, which may be in one or several pieces.

B is a spindle, preferably of non-magnetic material, to which the armature A is attached in any suitable manner.

C C is an annular mass of soft iron, to which are attached, on either side, two masses of iron, D D, secured by bolts N N. The cylinder A fits very closely in the space inclosed by the masses C D.

E E are the exciting-coils, inclosed in the troughs or copper casings *e e*, which are insulated from the masses C and D D, in which they are placed. To prevent electrical contact between opposing faces of the field-magnet and armature, these faces of the field-magnet may be coated with an insulating-varnish.

F F are the terminals of the exciting-coils E E. These terminals pass through holes in the copper casings *e e* and in the iron masses.

G G are the positive and negative terminals of the machine. They are attached three to each of the copper casings, and pass through holes in the iron masses lined with insulating material.

H H are supports for the spindle of the armature, attached to the iron masses D D by the bolts K K.

L is a thrust-bearing screwing into the support H, by which the armature may be adjusted longitudinally on the shaft.

M is a jam-nut, by means of which the armature is fixed in its adjusted position.

Q Q are holes, insulated inside, for mercury to be poured into and out of the space between the armature A and the copper casings $e\ e$. The inner surfaces of the copper casings are not insulated, but may be electroplated with nickel to prevent amalgamation. The holes Q Q are furnished with plugs, by which they may be closed.

R R are channels to drain the surplus oil, the journals being lubricated by any suitable lubricant.

The coils of wire in E E are so connected that the magnetizing-current goes in opposite directions, respectively, in the two coils. The current may be derived from a separate source; or the coils of wire in E E may form part of the circuit through which the useful current passes, or they may be in a shunt of the useful-current circuit.

S S are rings by which the masses C and D D are lifted.

When using mercury contacts, I sometimes cut slots in the faces of the armature, or otherwise raise or depress a portion of the surface, to insure the rotation of and consequent centrifugal action of the mercury.

I do not wish to be understood as limiting myself to the employment of mercury for the purpose of maintaining electrical contact between the troughs and the armature, as, instead of a mercury contact, I may use copper bands or rings armed with inwardly-projecting brushes, which press against the periphery of the armature, such bands or rings being connected with or forming a part of the troughs. Any other expedient for maintaining contact without impeding the movement of the armature may be employed.

The parts D D are so proportioned that a line drawn from any part of E to the exterior and rotated about the axis will generate a surface of an area not less than the face of the cylinder A, and similar proportions are given to the mass C. This is important to observe, in order to prevent crowding together of the lines of force emanating from the face of the cylinder, which would be injurious to the efficiency of the machine.

All the lines of force in the machine represented pass almost continuously through iron, and this is an important feature of the machine.

The magnetizing-current is passed in opposite directions through the coils; hence the lines of force created by the coils converge from the two ends of the armature to the middle of its periphery, and an electro-motive force is set up at every point of the armature perpendicular to these lines of force and to the direction of motion. When the circuit is complete, this creates an electric current crossing all the lines of force, commencing at one of the terminals of the armature and passing through the armature to the other terminal. The same result would be obtained with any other shape of armature if its terminals lie upon any part of the inclosures E E, respectively.

Referring to the diagram Fig. 3, it will be observed that no local circuits can be set up in the mass of the armature. If there be two points, X Y, chosen at any positions in the mass, a line joining them cuts the lines of force, and it might be supposed that a local current could be set up; but such a current going from X to Y must have a return-circuit. This return-circuit cuts the lines of force and creates an electro-motive force, which will always be found to be exactly opposed in amount to that created in the other part of the circuit XY. Thus every closed circuit in the mass of the armature has equal opposing electro-motive forces, which prevent the creation of any current whatsoever. Thus in the diagram $a\ a b\ b$ are the lines of force, and the electro-motive force created from X to Y is proportional to the number of lines of force cut by X Y. In this case it is one—namely, the line $a\ a$. Now take any return-circuit, (X $r\ s\ t\ u\ v\ w\ z$ Y.) It cuts the lines $b\ b$ twice in opposite directions, which destroy each other. So with the lines $d\ d\ e\ e$, and in cutting again the line $a\ a$ at $t$ the electro-motive force of X Y is destroyed. So, also, every complete circuit must cut each line of force an equal number of times in opposite directions.

My invention, as hereinbefore stated, admits of various modifications of structure and mechanical details without departure from its spirit. Thus, for instance, as shown in Fig. 3ª, instead of a single cylinder constituting the armature, two disks mounted upon a shaft, each surrounded by a coil and both inclosed in the same mass of iron, may be employed, in which case the exterior face of each disk will form like poles, and opposite poles will be formed on the interior faces, the poles of the field-magnet being opposed to these.

In Fig. 4 of the drawings I have illustrated a modified form of machine, wherein the armature is a single disk of iron surrounded by a single coil and encompassed by a mass of iron constituting the field-magnet. In this form the disk has opposite poles, respectively, on each side, and the poles of the field-magnet are opposed thereto. The electric current passes from the periphery of the disk to its center, and is taken off from the shaft by a suitable collector, D'.

It would not be a departure from the spirit of my invention to place permanent magnets in a part of the magnetic circuit, in which case no coils would be required.

Having fully described my invention, what I claim, and desire to secure by Letters Patent, is—

1. In a machine for generating electricity of the unipolar type, the combination, with a rotating magnetized mass and a box-like mass of magnetic material recessed for the reception of magnetizing-coils, of metallic troughs inclosing said coils and inserted in said recesses, said troughs being insulated from the walls of said recesses, but in circuit with the rotating mass, substantially as described.

2. A magnetic circuit of iron in which all the lines of force are closed curves, a part of the iron being adapted to rotate about a central axis, whereby an electric circuit is generated in the rotating mass, the terminals from which said current is collected being one within and the other without all the circuits of lines of force.

In testimony that I claim the foregoing I have hereunto set my hand this 8th day of October, 1884.

GEORGE FORBES.

Witnesses:
EWELL A. DICK,
JOS. B. CONNOLLY.